J. Armstrong.
Condenser.
N° 91,700. Patented Jun. 22, 1869

Witnesses;
G. H. Smith.
Jas. S. Martin.

Inventor;
James Armstrong

United States Patent Office.

JAMES ARMSTRONG, OF BUCYRUS, OHIO.

Letters Patent No. 91,700, dated June 22, 1869.

IMPROVEMENT IN FEED-WATER HEATERS FOR STEAM-ENGINES.

The Schedule referred to in these Letters Patent and making part of the same.

*To all whom it may concern:*

Be it known that I, JAMES ARMSTRONG, of Bucyrus, in the county of Crawford, and State of Ohio, have invented a new and useful Improvement in Feed-Water Heater and Filter; and I do hereby declare that the following is a full, clear, and exact description thereof, reference being had to the accompanying drawings, in which—

Figure 1:
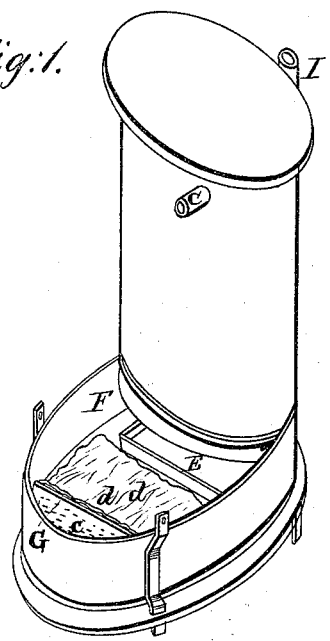
Figure 2:
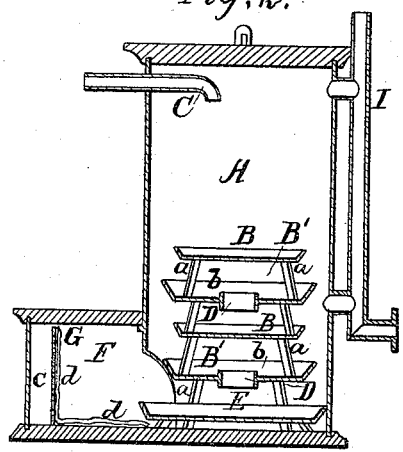

Figure 1 is a perspective view, and
Figure 2, a central vertical section.

The nature of my invention consists in a peculiar arrangement and construction of a feed-water heater and filter, for heating and filtering water by the use of waste steam from boilers.

To enable those skilled in the art to make and use my invention, I will proceed to describe its construction and operation.

A represents a chamber, in which are pans, B B'.

On the bottom of these pans are feet, $a$; the feet of the lower pan resting on the bottom of the chamber A, the feet of the next pan resting in the first one, and so on throughout the entire number.

In the side of the chamber A is a pipe, C, which enters above and discharges the water into the upper pan.

Any desired number of pans may be used, the diameter of the upper one, B, beng smaller than the next one below it, B', the larger one having an opening, D, in its bottom, around the edge of which is a flange, $b$.

E is a pan, which is placed under the pans B B', and in it, if desired, a filter may be placed.

F is a receiver, which is an extension of the chamber A, into which the water passes after having passed through the pans B B'.

Across the outer end of this extension is a filter, G, which is composed of a perforated piece of wood or metal, $c$, and a piece of cloth or sponge, $d$, which is placed on the side of the perforated piece $c$, next to the chamber A, as seen in fig. 2.

H represents the pipe for the passage of water to the boiler.

I represents a pipe, through which the steam enters the chamber A.

Its operation is as follows:

The water enters the chamber A through the pipe C, fills the upper pan, then runs over its sides into the next one below it, which in turn is filled up to the top of the flange $b$, and the water then runs over the top of that, through the opening D, into the pan below, and so on throughout the entire series. At the same time the steam is let into the chamber A through the pipe I, and by contact with the water, heats it, which causes the lime and other impurities in the water to be deposited in the bottom of the pans. After the water has passed through the pans B B', it passes through the filter G, by which time it has been relieved of its impurities, and then passes to the boiler through the pipe H.

Having thus fully described my invention,

What I claim, and desire to secure by Letters Patent, is—

1. The chamber A and receiver F, when constructed and arranged substantially as shown and described.

2. The pans B B', when constructed and arranged substantially as shown and described.

JAMES ARMSTRONG.

Witnesses:
G. A. C. SMITH,
JAS. S. MARTIN.